United States Patent
Kuehnle et al.

(10) Patent No.: US 9,286,695 B2
(45) Date of Patent: Mar. 15, 2016

(54) SYSTEMS AND METHODS FOR TRACKING POINTS WITHIN AN ENCASEMENT

(71) Applicant: Bendix Commercial Vehicle Systems LLC, Elyria, OH (US)

(72) Inventors: Andreas U. Kuehnle, Strangnas (SE); Cathy L. Boon, Orange, CA (US); Hans M. Molin, Mission Viejo, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 140 days.

(21) Appl. No.: 14/209,227

(22) Filed: Mar. 13, 2014

(65) Prior Publication Data
US 2015/0262378 A1    Sep. 17, 2015

(51) Int. Cl.
G06K 9/00    (2006.01)
G06T 7/20    (2006.01)
G06T 11/00   (2006.01)

(52) U.S. Cl.
CPC . *G06T 7/204* (2013.01); *G06T 7/20* (2013.01); *G06T 7/2053* (2013.01); *G06T 7/2066* (2013.01); *G06T 11/001* (2013.01); *G06T 2207/10004* (2013.01); *G06T 2207/10024* (2013.01); *G06T 2207/30241* (2013.01); *G06T 2207/30244* (2013.01)

(58) Field of Classification Search
CPC ......... G06T 11/001; G06T 7/20; G06T 7/204; G06T 7/2053; G06T 7/2066; G06T 2207/10004; G06T 2207/10024; G06T 2207/30241; G06T 2207/30244
See application file for complete search history.

(56) References Cited

U.S. PATENT DOCUMENTS

| | | | |
|---|---|---|---|
| 6,137,893 A | 10/2000 | Michael et al. | |
| 6,259,802 B1 * | 7/2001 | Jolly | G06T 7/2033 382/103 |
| 6,400,830 B1 | 6/2002 | Christian et al. | |
| 6,526,156 B1 | 2/2003 | Black et al. | |
| 6,711,293 B1 | 3/2004 | Lowe | |
| 6,795,567 B1 | 9/2004 | Cham et al. | |
| 7,295,709 B2 | 11/2007 | Cootes et al. | |
| 8,373,754 B2 | 2/2013 | Kuehnle et al. | |
| 8,379,088 B2 | 2/2013 | Kuehnle et al. | |
| 2007/0154097 A1 | 7/2007 | Wang et al. | |
| 2007/0273766 A1 * | 11/2007 | Wilson | G01S 3/7864 348/169 |
| 2008/0253609 A1 * | 10/2008 | Pelletier | G06T 7/2033 382/103 |
| 2009/0133840 A1 * | 5/2009 | Yeom | H01J 37/321 156/345.48 |
| 2009/0238460 A1 | 9/2009 | Funayama et al. | |

OTHER PUBLICATIONS

David G Lowe ("Distinctive Image Features from Sale-Invariant Keypoints", International Journal of Computer Vision, 2004).*

(Continued)

*Primary Examiner* — Amara Abdi
(74) *Attorney, Agent, or Firm* — Crowell & Moring LLP

(57) ABSTRACT

Systems and methods for tracking points within an encasement are provided. According to an aspect of the invention, a processor designates an encasement at a first location within a first image acquired at a first time; identifies points to track within the encasement; determines characteristics of the points to track; tracks the points over time based on the characteristics; and determines a second location of the encasement within a second image acquired at a second time based on positions of the tracked points at the second time. Identifying the points to track may include identifying points within the encasement that are significant and persistent.

19 Claims, 13 Drawing Sheets

(56) References Cited

OTHER PUBLICATIONS

Bradski, Gary et al., "Tracking and Motion," Learning OpenCV, Sep. 2008, pp. 316-322, Chapter 10, O'Reilly Media, Inc., Sebastopol, CA, USA.

Adoniscik, Akinoame et al., "Scale-invariant feature transform," pp. 1-13, http://en.wikipedia.org/w/index.php?oldid=585477228 (last accessed Jan. 23, 2014).

Kaufmann, Andreas et al., "Block-matching algorithm," pp. 1 and 2, http://en.wikipedia.org/w/index.php?oldid=557188626 (last accessed Jan. 23, 2014).

* cited by examiner

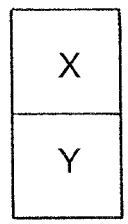
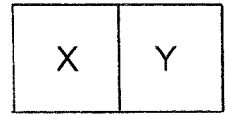
FIG. 7A  FIG. 7B
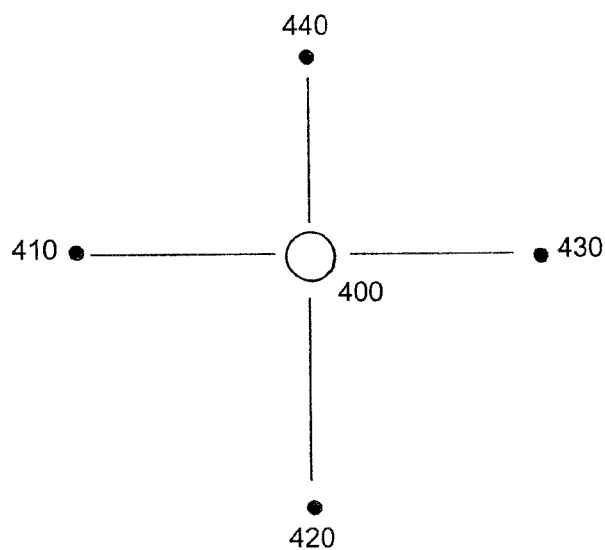
FIG. 8

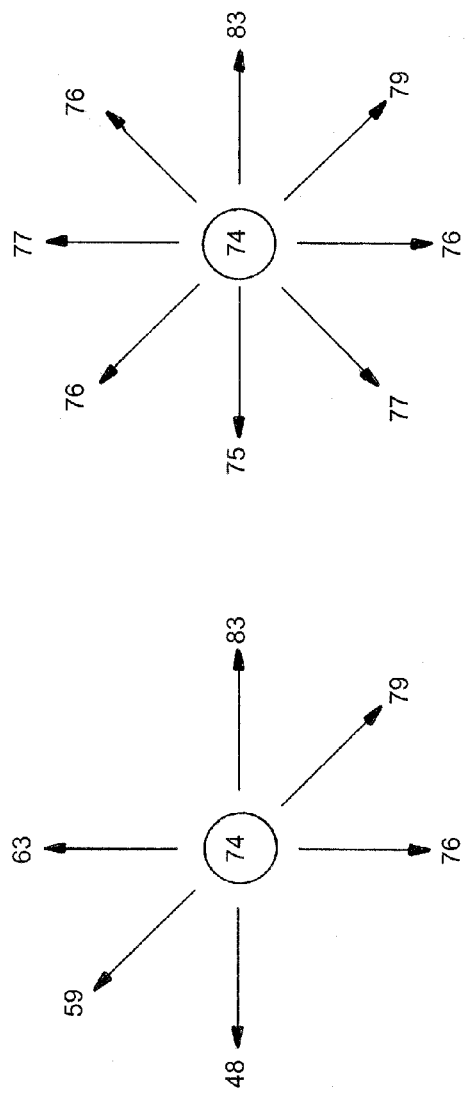
FIG. 9B
FIG. 9A
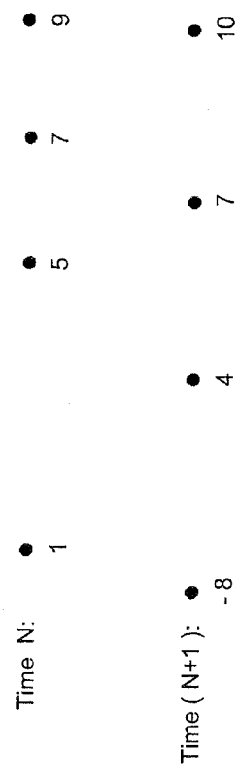
FIG. 10

SYSTEMS AND METHODS FOR TRACKING POINTS WITHIN AN ENCASEMENT

BACKGROUND OF THE INVENTION

The present invention relates to tracking points within an encasement that is designated in an image. Embodiments of the invention use the new positions of the points to determine the new position of the encasement. For example, embodiments of the invention may be used to follow an object that is monitored by a camera, where both the object and the camera are moving.

Related art methods typically track an object by using contoured edges of the object. For example, U.S. Pat. No. 6,259,802 discloses a method of tracking an object by using contoured edges of the object. This method follows an optimal edge throughout video frames to determine the motion of the object. Similarly, U.S. Pat. No. 6,526,156 discloses an object tracking system that selects an edge of an image based on edge energy. The image is bounded so that a travel path can be determined. This system follows an optimal contour through the travel path. In contrast, embodiments of the invention do not track the encasement directly, or directly follow the motion of a specific object over time.

SUMMARY OF THE INVENTION

Exemplary embodiments of the invention provide systems and methods for tracking points within an encasement that is designated in an image. According to an aspect of the invention, a processor designates an encasement at a first location within a first image acquired at a first time; identifies points to track within the encasement; determines characteristics of the points to track; tracks the points over time based on the characteristics; and determines a second location of the encasement within a second image acquired at a second time based on positions of the tracked points at the second time. Identifying the points to track may include identifying points within the encasement that are significant, and identifying significant points that are persistent.

Identifying the significant points may include, for each of a plurality of points within the encasement, determining a local gradient of the point along each of a plurality of directions; comparing a magnitude of the local gradient to a threshold for each of the plurality of directions; and identifying the point as significant if the magnitude of the local gradient is not less than the threshold for any one of the plurality of directions. Alternatively, identifying the significant points may include, for each of a plurality of points within the encasement, determining a local gradient of the point along each of a plurality of directions; comparing a magnitude of the local gradient to a threshold for each of the plurality of directions; and identifying the point as significant if the magnitude of the local gradient is not less than the threshold for each of the plurality of directions, and a sign of the local gradient is the same for each of the plurality of directions. A type may be assigned to each of the significant points based on which of the plurality of directions of the local gradient is not less than the threshold.

Identifying the significant points may also include, for each of the plurality of points within the encasement, determining a desirability of the point as a product of the magnitudes of the local gradients for each of the plurality of directions; and if a plurality of adjacent points are identified as significant, removing significant points whose desirability is not greater than a desirability of all immediately neighboring points. Identifying the significant points that are persistent may include scaling and shifting locations of the significant points with respect to locations of corresponding points within a third image acquired at a third time, such that an overlap between the significant points and the corresponding points is maximized; repeating the scaling and shifting with respect to locations of corresponding points within a plurality of additional images acquired at a plurality of additional times until enough information to analyze the significant points is available; and for each of the significant points, determining a percentage overlap between the significant point and the corresponding points within the third image and the plurality of additional images, and identifying the significant point as persistent if the percentage overlap over time is not less than a minimum percentage.

The characteristics of the points to be tracked may include a local gradient along each of a plurality of directions and a ruler location with respect to the encasement. Alternatively, the characteristics of the points to be tracked may include a grayscale or a color of the points. Tracking the points over time may include, for each of the points, determining whether there is a second point of a same type as the point and near the point within a third image acquired at a third time. The type may be a corner type or an edge type. If it is determined that there is only one second point of the same type near the point within the third image, the position of the point may be updated as a position of the second point. Further, a local gradient of the point may be updated as an average of the local gradient of the point and a local gradient of the second point.

If it is determined that there is more than one second point of the same type near the point within the third image, the position of the point may be updated as the position of the one of the second points whose neighborhood is most similar to a neighborhood of the point. Further, a local gradient of the point may be updated as an average of the local gradient of the point and a local gradient of the one of the second points whose neighborhood is most similar to a neighborhood of the point.

If it is determined that there is no second point of the same type near the point within the third image, a hold counter may be determined, and the point may be removed from the points to track if a maximum value of the hold counter is reached.

The determining of the second location of the encasement may include selecting pairs of the tracked points; for each of the pairs, determining a length of the encasement based on a position of each of the points with respect to the encasement and a distance between the points; for each of the pairs, determining the second location of the encasement within the second image based on the length of the encasement, the position of each of the points with respect to the encasement, and a position of each of the points at the second time; and selecting an optimal second location of the encasement from the second locations of the encasement determined for each of the pairs. The optimal second location may be the median or the average of the second locations of the encasement determined for each of the pairs.

Alternatively, the determining of the second location of the encasement may include scaling and shifting locations of the tracked points within the first image with respect to locations of corresponding points within the second image according to a transformation in which an overlap between the tracked points and the corresponding points is maximized; and scaling and shifting the location of the encasement according to the transformation.

According to another aspect of the invention, a tracking system is provided. The tracking system includes a memory and a processor coupled to the memory. The processor includes encasement designation logic that designates an encasement at a first location within a first image acquired at a first time; point identification logic that identifies points to track within the encasement; point characterization logic that determines characteristics of the points to track; point tracking logic that tracks the points over time based on the characteristics; and location determination logic that determines a second location of the encasement within a second image acquired at a second time based on positions of the tracked points at the second time.

According to yet another aspect of the invention, a non-transitory computer-readable medium including computer instructions executable by a processor to cause the processor to perform the methods discussed above is provided.

Other objects, advantages, and novel features of the present invention will become apparent from the following detailed description of the invention when considered in conjunction with the accompanying drawings.

BRIEF DESCRIPTION OF THE DRAWINGS

FIGS. 7A and 7B show examples of edge types of points;

FIG. 8 shows an example of an immediate neighborhood of a point;

FIGS. 9A and 9B show examples of using grayscale to determine the significance of a point;

FIG. 10 shows an example of a scaling and shifting transformation for a set of points at two times;

DETAILED DESCRIPTION OF EXEMPLARY EMBODIMENTS

Figure 1:
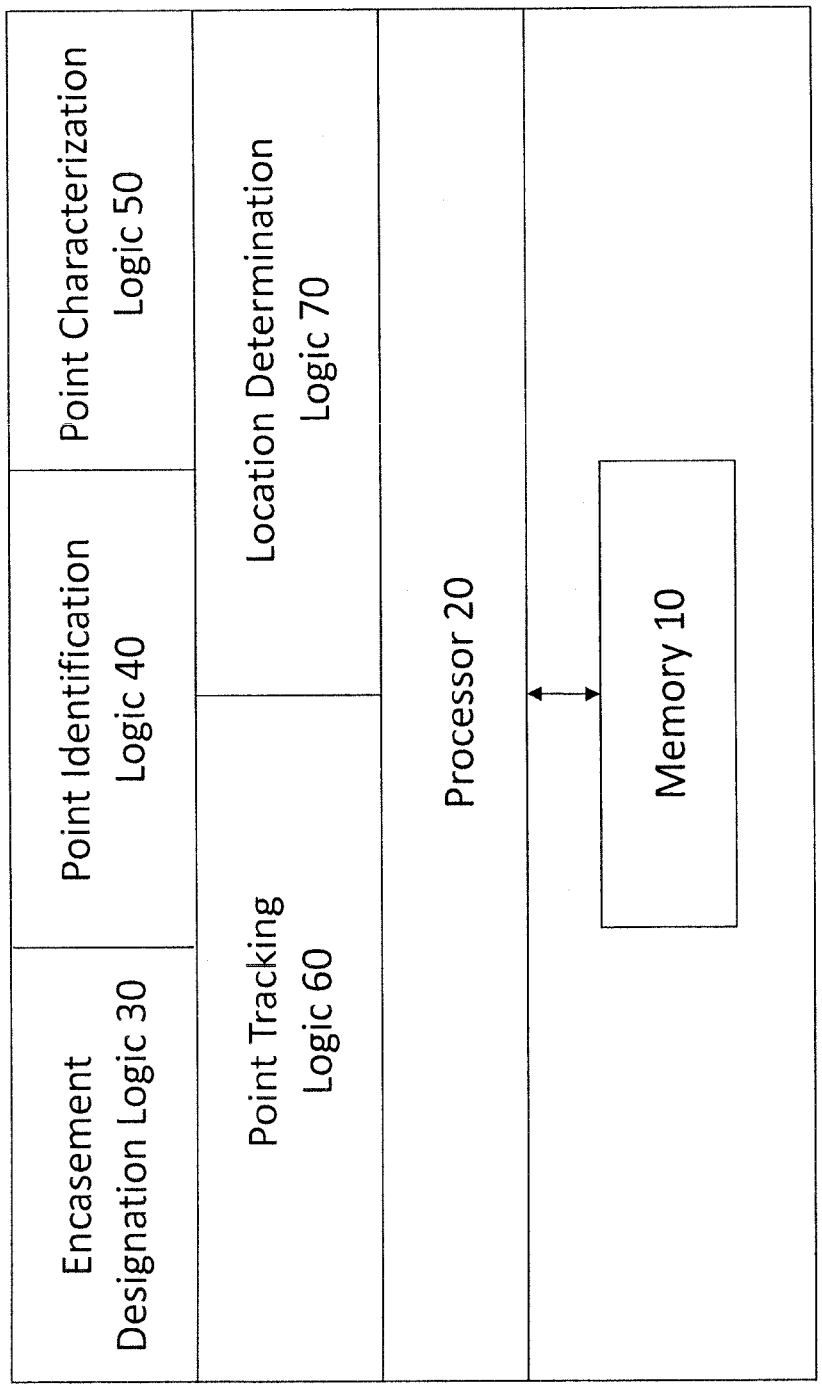
FIG. 1 shows a block diagram of an exemplary embodiment of a system for tracking points within an encasement that is designated in an image.

FIG. 1 shows a block diagram of an exemplary embodiment of a system for tracking points within an encasement that is designated in an image. As shown in FIG. 1, the system includes a memory 10 and a processor 20 coupled to the memory 10. The processor 20 includes logic 30-70, which will be described in more detail below in connection with FIG. 2. The processor 20 can be any type of processor, such as a microprocessor, a field programmable gate array (FPGA), and/or an application specific integrated circuit (ASIC). When the processor 20 is a microprocessor, logic 30-70 can be processor-executable code that is loaded from the memory 10.

Figure 2:
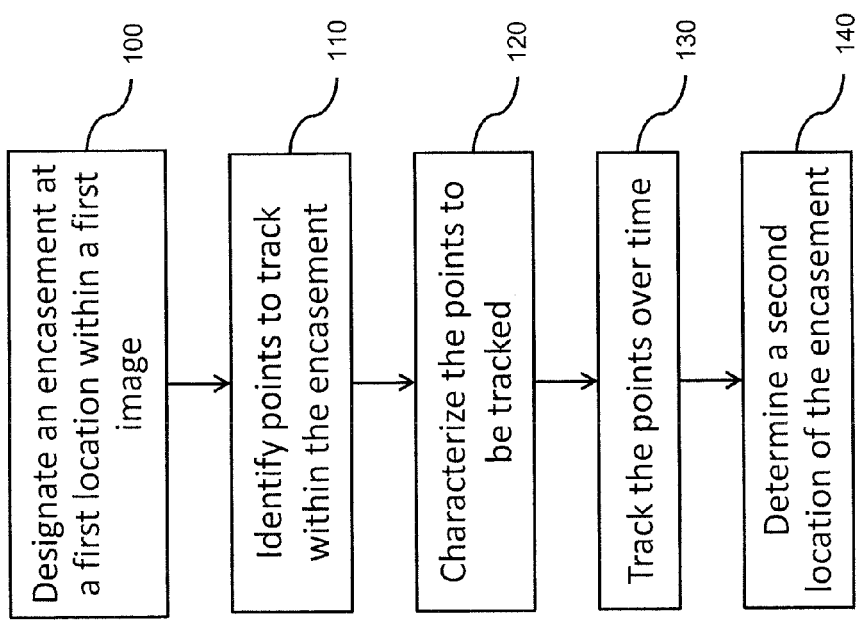
FIG. 2 shows a flowchart of an exemplary embodiment of a method for tracking points within the encasement.
Figure 3:
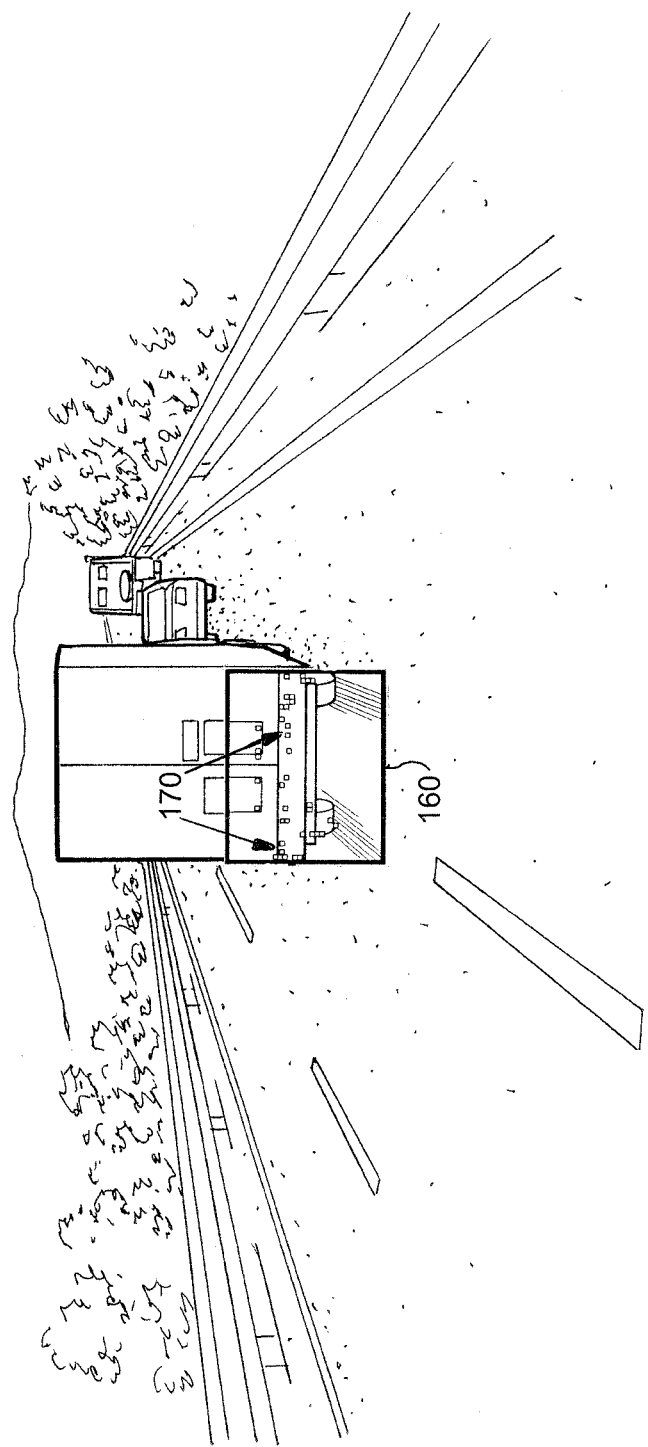
FIG. 3 shows examples of points within the encasement that may be tracked.

FIG. 2 shows a flowchart of an exemplary embodiment of a method for tracking points within the encasement. As shown in FIG. 2, the encasement designation logic 30 designates an encasement at a first location within an image at step 100. For example, as shown in FIG. 3, the encasement designation logic 30 may designate the encasement 160 as a region within an image from a camera or a frame from a video feed. A user may indicate the encasement 160 to be designated, or the encasement 160 may be indicated by any appropriate method or device, such as a sensor, radar, pattern recognition algorithm, information source, or map. Although the encasement 160 shown in FIG. 3 is a two-dimensional region, the encasement 160 may alternatively be any appropriate n-dimensional volume.

Figure 4:
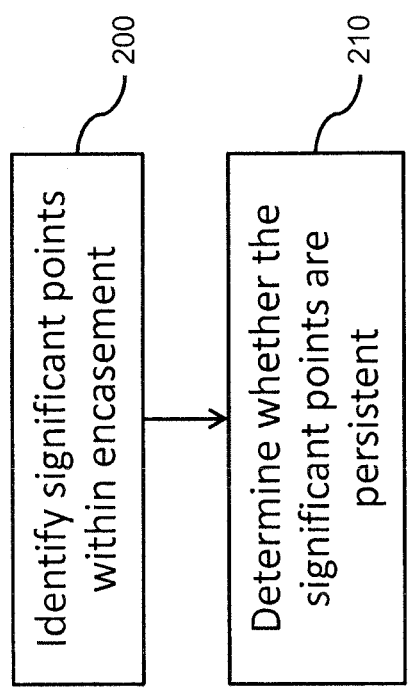
FIG. 4 shows a flowchart of an exemplary embodiment of a method for identifying the points to track.

As shown in FIG. 2, the point identification logic 40 then identifies points to track within the encasement 160 at step 110. FIG. 3 shows examples of points 170 within the encasement 160 that may be tracked. FIG. 4 shows a flowchart of an exemplary embodiment of a method for identifying the points to track. As discussed in further detail below, the points to track are advantageously both significant and persistent.

As shown in FIG. 4, the point identification logic 40 first identifies significant points within the encasement 160 at step 200. In order to be significant, a point should be different from neighboring points and have a clear position. In contrast, points that are similar to neighboring points, such as a point having a middling gray level surrounded by neighboring points having a similar middling gray level, should not be selected. Similarly, points that have a poorly defined position relative to homogeneous areas within the encasement 160 should not be selected. Accordingly, the point identification logic 40 may make a differential characterization of the point's surroundings by measuring the local gradient in a plurality of directions. If the local gradient has a sufficiently large magnitude in at least one direction, the point may be significant. Alternatively, the point may be significant if the local gradient has a sufficiently large magnitude in more than one direction, or in all directions.

Figure 5:
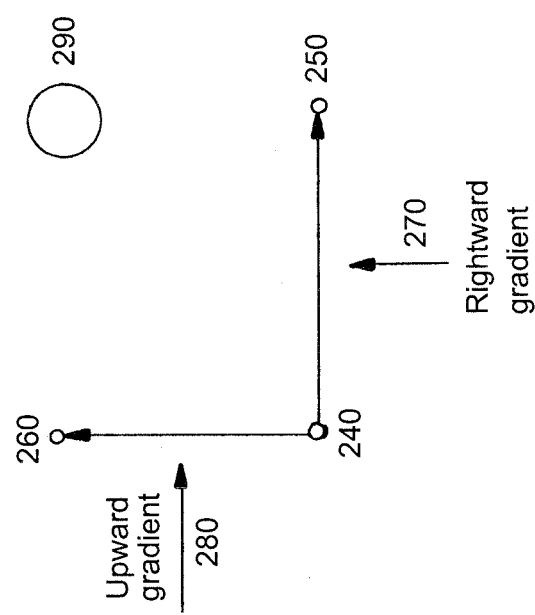
FIG. 5 shows an example of differential characterization of a point.

FIG. 5 shows an example of the differential characterization. In this example, the points 250 and 260 directly adjacent to the point 240 are considered, and the local gradient at the point 240 is measured. By using the local gradient, the effects of changing illumination are reduced. As shown in FIG. 5, a positive rightward gradient 270 toward the point 250 and a positive upward gradient 280 toward the point 260 are measured. The combination of the positive rightward gradient 270 and the positive upward gradient 280 indicates that a corner 290 is present in the upper right-hand quadrant. The point 240 may be a significant point if the magnitude of the rightward gradient 270 is greater than or equal to a threshold, and the magnitude of the upward gradient 280 is greater than or equal to the threshold. In this situation, the point 240 is classified as having a bright upper right-hand corner. The threshold may be any suitable value, and may adjusted by a user in order to optimize the results of the tracking.

Figure 6:
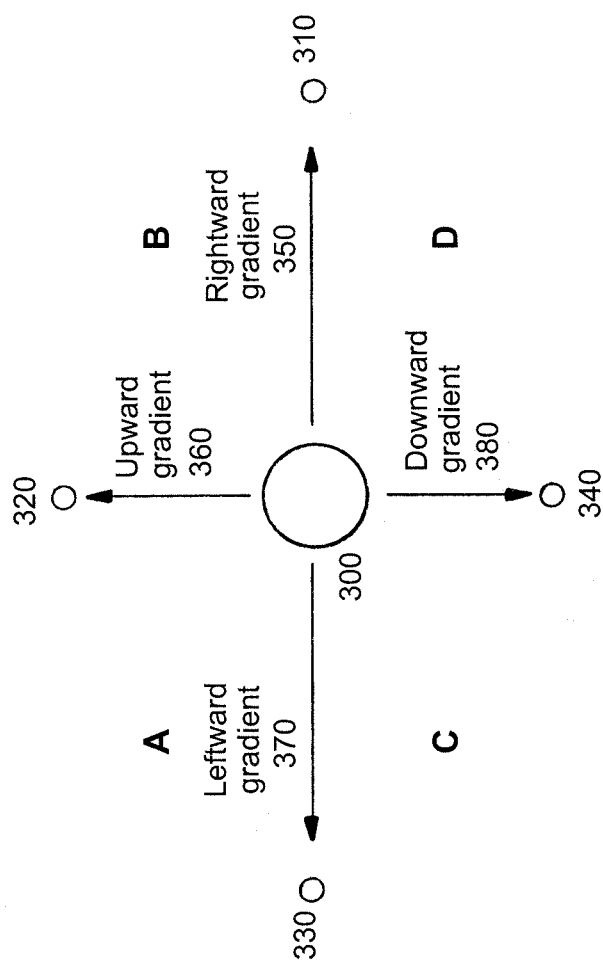
FIG. 6 shows an example of gradients of a point.

Because the magnitude of the gradient is compared with the threshold, it is possible that a gradient with a negative value may be greater than or equal to the threshold. For example, FIG. 6 shows an example in which four quadrants A, B, C, and D are defined, with a point 300 at the origin. Here the rightward gradient 350 toward the point 310 and the upward gradient 360 toward the point 320 are positive, while the leftward gradient 370 toward the point 330 and the downward gradient 380 toward the point 340 are negative. Accordingly, four corner types are possible: (1) an upper right-hand bright corner in quadrant B, in which case the magnitude of the rightward gradient 350 and the magnitude of the upward gradient 360 exceed the threshold; (2) an upper left-hand bright corner in quadrant A, in which case the magnitude of the leftward gradient 370 and the magnitude of the upward gradient 360 exceed the threshold; (3) a lower left-hand bright corner in quadrant C, in which case the magnitude of the leftward gradient 370 and the magnitude of the downward gradient 380 exceed the threshold; and (4) a lower right-hand bright corner in quadrant D, in which case the magnitude of the rightward gradient 350 and the magnitude of the downward gradient 380 exceed the threshold.

A point may be determined to have a corner type when the point is darker or lighter than the three adjacent points that form an L shape around the point. Put differently, a point may be determined to have a corner type when the gradients in all directions within a quadrant defined by the point have the same sign. Accordingly, a point may have up to four different corner types simultaneously.

As discussed above, a point may be significant if it has a local gradient that is greater than or equal to the threshold in one direction. As shown in FIGS. 7A and 7B, four edge types are possible: (1) a horizontal negative edge in which the value Y is greater than the value X in FIG. 7A; (2) a horizontal positive edge in which the value Y is less than the value X in FIG. 7A; (3) a vertical negative edge in which the value Y is greater than the value X in FIG. 7B; and (4) a vertical positive edge in which the value Y is less than the value X in FIG. 7B. A point may be up to two edge types simultaneously, specifically one horizontal edge type and one vertical edge type. A horizontal edge feature in the image may be identified by a series of significant horizontal edge points. A vertical edge feature in the image may be identified by a series of significant vertical edge points. A diagonal edge feature in the image may be identified by a series of significant locations having both horizontal and vertical edge types.

The point identification logic 40 may also determine a desirability of a point by calculating the product of the magnitudes of the local gradients at the point along at least two directions. A higher desirability indicates that a point has a greater significance. The desirability may be used to remove points if there are multiple adjacent significant points. For example, only points whose desirability is higher than the desirability of its four immediate neighbors may be kept as significant points. This example is shown in FIG. 8, in which point 400 is kept only if it has a higher desirability than points 410, 420, 430, and 440. Alternatively, a point may be kept only if it has a higher desirability than all $2^N$ directions in higher dimensions, where N is the number of dimensions. This thinning procedure better localizes the significant points within an image, and reduces confusion when tracking the points later.

As another alternative, color or grayscale may be used to determine a point's significance. For example, as shown in FIG. 9A, the circled pixel having a gray level of 74 has an upper left-hand dark corner and a lower right-hand bright corner. This is determined by comparing the gray level of the circled pixel with the gray levels of the surrounding pixels. Here all of the pixels in the upper left-hand quadrant have gray levels less than 74, and all of the pixels in the lower right-hand quadrant have gray levels greater than 74. FIG. 9B shows another example in which the circled pixel has an upper left-hand bright corner, an upper right-hand bright corner, a lower left-hand bright corner, and a lower right-hand bright corner. If color is provided instead of grayscale, the analysis may be modified to analyze the individual red, green, and blue components of the colors of the pixels.

Returning to FIG. 4, the point identification logic 40 next determines whether the significant points within the encasement 160 are persistent at step 210. Within two consecutive images, there is a first set of points at time n within the first image, and a second set of points at time n+1 within the second image. Because the images are acquired at different times, such as from a moving camera viewing a changing scene, it is advantageous to allow for transformations between the images. For example, a scaling and shifting transformation may be used, such that the (x,y, . . . ) location of a point changes according to the following:

$$(x,y, \ldots) \text{ at } n+1 = \text{scale} * (x,y, \ldots) \text{ at } n + \text{shifts in } (x,y, \ldots) \quad (1)$$

The goal of the scaling and shifting transformation is to maximize the overlap between the first set of points at time n and the second set of points and time n+1. Points are treated as overlapping if they have sufficiently similar (x,y, . . . ) values. The similarity may be evaluated by any appropriate method. For example, the distance between two points may be compared to a threshold. As an alternative, the components of the distance between two points may be separately measured, added, and then compared to a threshold.

In a two-dimensional context, a set of points may move in each direction, and/or grow larger or shrink. FIG. 10 shows an example of maximizing the overlap by the scaling and shifting transformation. The points shown in FIG. 10 are labeled by their locations on a ruler. In this example, the scale increases by 50% and shifts to the left by 3.5 units. This provides an overlap of 75% at the rightmost three points. The encasement 160 is then scaled and shifted by the same quantities, such that the encasement 160 scales and shifts together with the significant points that it encloses.

Figure 11:
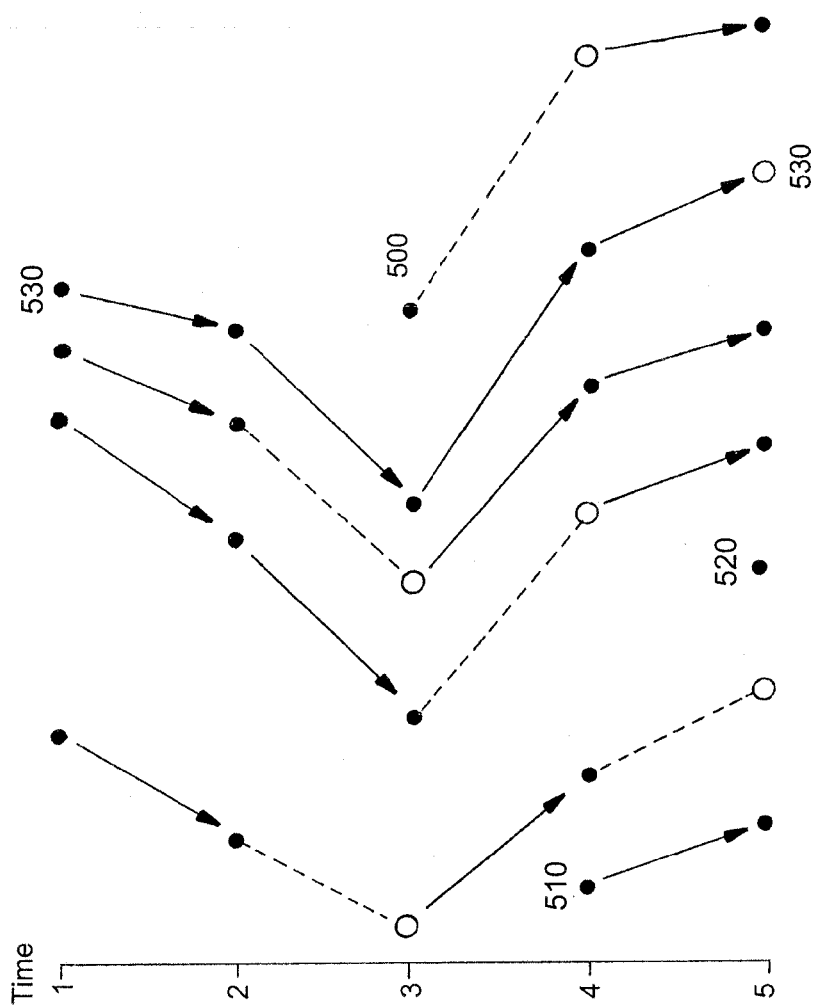
FIG. 11 shows an example of a scaling and shifting transformation for a set of points at five times.

The scaling and shifting transformation is repeated for a number of additional time steps, with an independent scaling and shifting transformation being used to connect each time step with the next time step. The percentage overlap is maximized at each time step by an appropriate choice of the scaling and shifting factors. However, some points may not appear at the next time step, or new points may appear at the next time step. For example, as shown in FIG. 11, only point 530 is present at all of the time steps, such that it has 100% overlap throughout times 1-5. Points 500, 510, and 520 appear as new points at times 3, 4, and 5, respectively. Any significant points that have at least a minimum overlap are identified as persistent. Although the scaling and shifting transformation shown in FIG. 11 is performed in one dimension, the transformation may be performed in any appropriate number of dimensions. For example, in two dimensions, the data may be ordered to be matched by row and column, which makes the transformation more computationally efficient. The ordering may be done in linear time, and reduces the $N^2$ computation to a fraction thereof.

Returning to FIG. 2, the point characterization logic 50 then determines characteristics of the points to be tracked at step 120. The local gradient in a plurality of dimensions and the ruler location with respect to the encasement 160 may be found for each of the significant and persistent points. For example, if the local gradient indicates that the image becomes darker downward and to the right, the point may be characterized as having a lower right-hand dark corner. As another example, if the local gradient indicates that the image becomes darker downward, regardless of the right-left gradient, the point may be characterized as having a horizontal positive edge. It is assumed that the type of a point remains the same over time.

Further, the locations of the points with respect to the encasement 160 are assumed to be constant. For example, if a point is initially located halfway between the left and right sides of the encasement 160, it is assumed that the point remains halfway between the left and right sides of the encasement 160, even after a scaling and shifting transformation. Accordingly, each point within the encasement 160 has a ruler location that is defined with respect to the encasement 160. For example, for a rectangular encasement 160, a point may have a ruler location that is 32% from the left side of the encasement 160 and 11% from the top of the encasement 160. This idea may also be extended to non-rectangular encasements, non-convex encasements, encasements that are not aligned with the axes, and higher dimensional encasements.

Returning to FIG. 2, the point tracking logic 60 then tracks the significant and persistent points over time at step 130. First, starting with a point within a first image acquired at time n, the point tracking logic 60 determines whether there is a point of the same type at a similar location in a second image acquired at time n+1. The point tracking logic 60 may look within a predetermined range, such as within a hypersphere, or by scanning over nearby rows and columns in two dimensions.

If it is determined that there is only one point of the same type at a similar location in the second image, it is assumed that the point moved to that location, and the position of the point is updated accordingly. If it is determined that there is more than one point of the same type at a similar location in the second image, the neighborhoods of the points in the second image are analyzed. For example, a sum of absolute differences metric may be used to find the neighborhood in the second image that is most similar to the neighborhood in the first image. If the local gradients at the point in the first image are a1, a2, ..., an, and the local gradients at one of the points in the second image are b1, b2, ..., bn, then the sum of absolute differences (SAD) is determined by the following:

$$SAD = \sum_{i=1}^{n} |a_i - b_i| \quad (2)$$

The position of the point is then updated as the position of the point with the most similar neighborhood in the second image, as indicated by the SAD values of the point in the first image with respect to the points in the second image.

If no significant point of the same type can be found at a similar location in the second image, a hold counter may be established, and the position of the point may be predicted from one image to the next based on the scaling and shifting transformation values until a maximum value of the hold counter is reached. Once the maximum value has been reached, the point is no longer followed.

Once a new location has been established for a point, the point tracking logic 60 may also update the local gradient of the point. For example, the local gradient may be updated as an average of the local gradients of the point in the first image and the second image. The local gradient may be updated along a plurality of directions.

Figure 12:
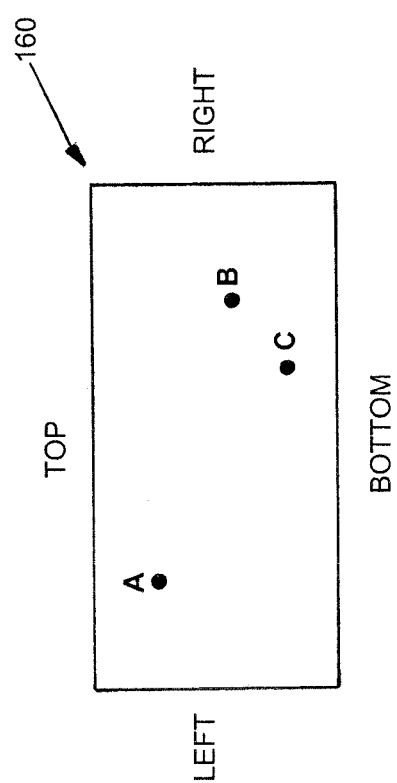
FIG. 12 shows an example of locations of points within the encasement.

Returning to FIG. 2, the location determination logic 70 then determines the new location of the encasement 160 based on the positions of the tracked points at step 140. As discussed above, the locations of the points with respect to the encasement 160 are assumed to be constant. For example, as shown in FIG. 12, point A is 20% from the left side of the encasement 160 and 20% from the top side of the encasement 160; point B is 80% from the left side of the encasement 160 and 60% from the top side of the encasement 160; and point C is 70% from the left side of the encasement 160 and 80% from the top side of the encasement 160. As the points move over time, these percentages that define their locations with respect to the encasement 160 remain the same.

Accordingly, it is possible to determine the distance between two sides of the encasement 160 based on a pair of the points as follows:

$$\text{Length} = \frac{\text{distance between points } A \text{ and } B}{\text{point } A \text{ percentage} - \text{point } B \text{ percentage}} \quad (3)$$

Figure 13:
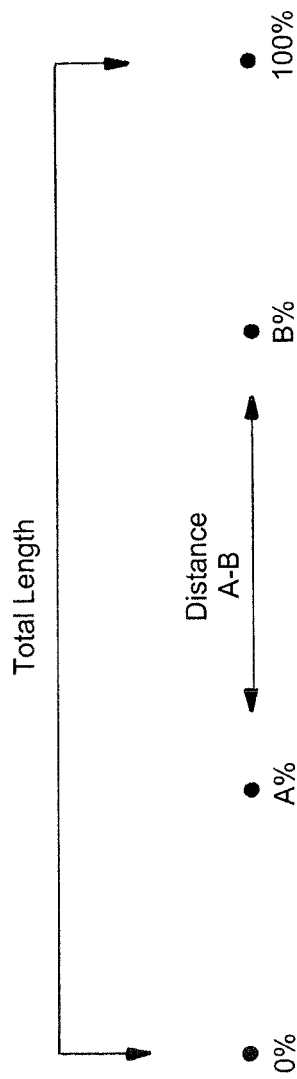
FIG. 13 shows an example of determining the distance between two sides of the encasement.

This calculation is illustrated schematically in FIG. 13. The locations of the sides of the encasement 160 are then determined as follows:

$$\text{Left side} = \text{point } A \text{ location} - (\text{point } A \text{ percentage} * \text{length}) \quad (4)$$

$$\text{Right side} = \text{point } B \text{ location} + ((100\% - \text{point } B \text{ percentage}) * \text{length}) \quad (5)$$

Here the locations of the points are their final tracked positions as determined at the end of the tracking process. This calculation may be repeated for some or all of the pairs of points within the encasement 160.

Figure 14:
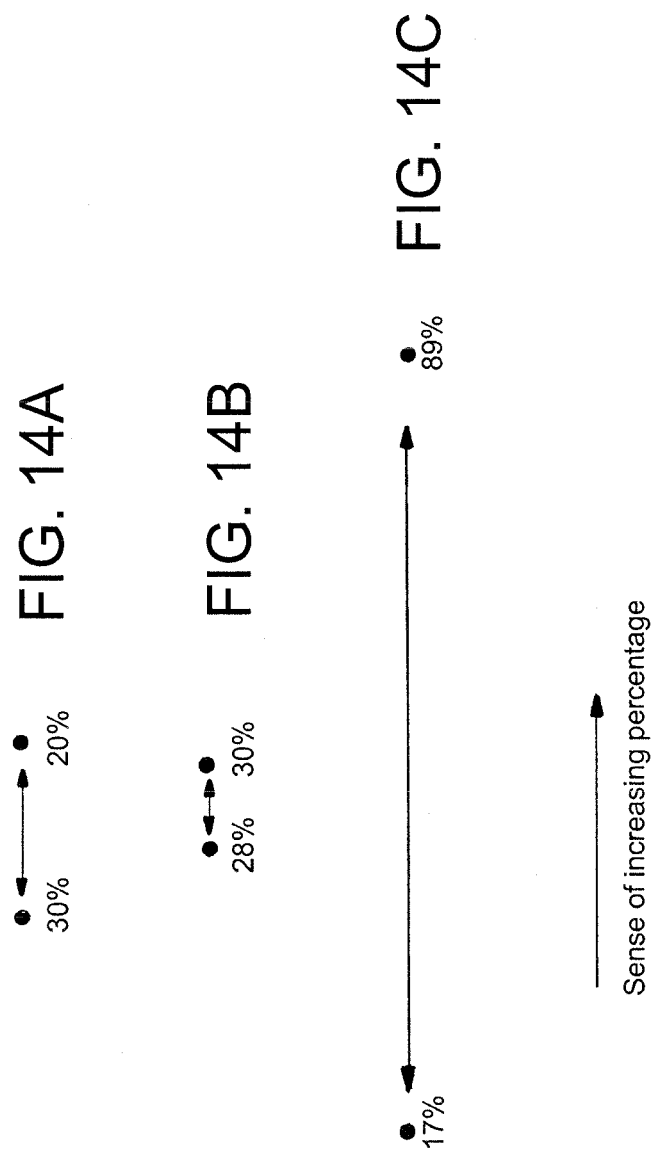
FIGS. 14A-14C show examples of erroneous, dubious, and good points to use for determining the location of the encasement.

If all of the pairs of points within the encasement 160 are analyzed, there will be n*(n−1)/2 pairings for n points. Accordingly, there are likely to be different results for the length and location of the encasement 160. In order to reconcile any different results, the location determination logic 70 may use the median or the average of all of the locations determined based on the pairs of points. Further, erroneous and/or dubious locations may be removed. A location is erroneous if a point whose percentage is lower than another point has moved to the wrong side of the other point. For example, as shown in FIG. 14A, a location determined by using a 20% point located to the right of a 30% point cannot be correct. A location is dubious if it was determined by points whose percentages are close to each other, such as the points shown in FIG. 14B. The uncertainty arises from the relatively large effect of a small error when the points are close together. As a limiting case, if two points having different percentages are in the same row, column, or other dimension, the location will be indeterminate. In contrast, FIG. 14C shows an example of a good point spacing for determining the location of the encasement 160. The best results are given by randomly distributed, widely spaced points within the encasement 160. If each point drifts in a random fashion, then each point is expected to produce a random, zero-mean error for the location of the encasement 160.

Figure 15:
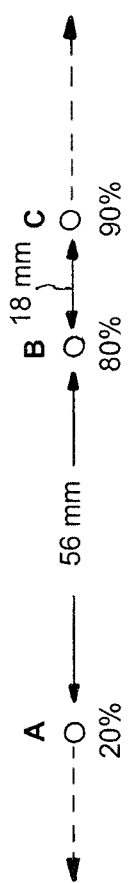
FIG. 15 shows a one-dimensional example in which the locations of the left side and the right side of the encasement are determined based on three points.

FIG. 15 shows a simple one-dimensional example in which the locations of the left side and the right side of the encasement 160 are determined based on three points A, B, and C, which have ruler locations of 20%, 80%, and 90%, respectively. Points A and B are separated by 56 mm, and points B and C are separated by 18 mm. Based on the calculations discussed above, the left side of the encasement 160 is determined to be located at approximately 19, 21, and 36 mm to the left of point A, respectively, by the three pairs of points. The median location of approximately 21 mm to the left of point A is selected as the location of the left side of the encasement 160. Similarly, the right side of the encasement 160 is determined to be located at approximately 1, 10, and 18 mm to the right of point C, respectively, by the three pairs of points. The median location of approximately 10 mm to the right of point C is selected as the location of the right side of the encasement 160.

As discussed above, the encasement 160 follows the points. Accordingly, in another embodiment, a scaling and shifting transformation similar to that discussed above may be performed to determine the final location of the encasement 160. For example, the tracked points within a first image may be scaled and shifted with respect to the corresponding points within the final image such that an overlap between the tracked points and the corresponding points is maximized. The encasement 160 may then be scaled and shifted according to the same transformation. The encasement 160 may then be displayed on the final image.

One example of an application of the method described above is capturing an image of a person who is standing under a street lamp for a brief time, and then determining the person's later position within the shadows based on only a few reflections from her clothing, handbag, and shoes. Further, the method described above may be used to detect the boundary of an object within an image. For example, if the encasement 160 includes an object and a background, the point pairs within the object will likely result in a different location for the encasement 160 than the point pairs within the background. Accordingly, a statistically significant difference in the resulting location of the encasement 160 may be used to segment the object from an erroneously included background.

The methods discussed above are executed by a computer processor that is programmed to perform the methods so that the processor executes the programming to perform the methods. Such a processor is needed to handle the large volumes of data and to perform the complex and computationally-intensive analysis of the methods discussed above. In addition, the processor is required to perform the methods in a commercially viable timeframe. Accordingly, it is necessary to quickly process large and complex data sets.

According to another exemplary embodiment of the invention, there is provided a non-transitory computer-readable medium encoded with a computer program for tracking points within an encasement that is designated in an image. The term "computer-readable medium" as used herein refers to any medium that participates in providing instructions for execution. Common forms of computer-readable media include, for example, a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, and any other non-transitory medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tracking method comprising:
    designating, by a processor, an encasement at a first location within a first image acquired at a first time;
    identifying, by the processor, points to track within the encasement;
    determining, by the processor, characteristics of the points to track;
    tracking, by the processor, the points over time based on the characteristics; and
    determining, by the processor, a second location of the encasement within a second image acquired at a second time based on positions of the tracked points at the second time,
    wherein the determining of the second location of the encasement comprises:
        selecting pairs of the tracked points;
        for each of the pairs, determining a length of the encasement based on a position of each of the points with respect to the encasement and a distance between the points;
        for each of the pairs, determining the second location of the encasement within the second image based on the length of the encasement, the position of each of the points with respect to the encasement, and a position of each of the points at the second time and
        selecting an optimal second location of the encasement from the second locations of the encasement determined for each of the pairs.

2. The method according to claim 1, wherein identifying the points to track comprises:
    identifying points within the encasement that are significant; and
    identifying significant points that are persistent.

3. The method according to claim 2, wherein identifying the significant points comprises, for each of a plurality of points within the encasement:
    determining a local gradient of the point along each of a plurality of directions;
    comparing a magnitude of the local gradient to a threshold for each of the plurality of directions; and
    identifying the point as significant if the magnitude of the local gradient is not less than the threshold for any one of the plurality of directions.

4. The method according to claim 2, wherein identifying the significant points comprises, for each of a plurality of points within the encasement:
    determining a local gradient of the point along each of a plurality of directions;
    comparing a magnitude of the local gradient to a threshold for each of the plurality of directions; and
    identifying the point as significant if the magnitude of the local gradient is not less than the threshold for each of the plurality of directions, and a sign of the local gradient is the same for each of the plurality of directions.

5. The method according to claim 3, further comprising assigning a type to each of the significant points based on which of the plurality of directions of the local gradient is not less than the threshold.

6. The method according to claim 3, wherein identifying the significant points further comprises, for each of the plurality of points within the encasement:
    determining a desirability of the point as a product of the magnitudes of the local gradients for each of the plurality of directions; and
    if a plurality of adjacent points are identified as significant, removing significant points whose desirability is not greater than a desirability of all immediately neighboring points.

7. The method according to claim 2, wherein identifying the significant points that are persistent comprises:
    scaling and shifting locations of the significant points with respect to locations of corresponding points within a third image acquired at a third time, such that an overlap between the significant points and the corresponding points is maximized;
    repeating the scaling and shifting with respect to locations of corresponding points within a plurality of additional images acquired at a plurality of additional times until enough information to analyze the significant points is available; and
    for each of the significant points, determining a percentage overlap between the significant point and the corresponding points within the third image and the plurality of additional images, and identifying the significant point as persistent if the percentage overlap over time is not less than a minimum percentage.

8. The method according to claim 1, wherein the characteristics of the points to be tracked comprise, for each of the points to be tracked, a local gradient along each of a plurality of directions and a ruler location with respect to the encasement.

9. The method according to claim 1, wherein the characteristics of the points to be tracked comprise, for each of the points to be tracked, a grayscale or a color of the points.

10. The method according to claim 1, wherein tracking the points over time comprises, for each of the points:
   determining whether there is a second point of a same type as the point and near the point within a third image acquired at a third time; and
   if it is determined that there is only one second point of the same type near the point within the third image, updating a position of the point as a position of the second point.

11. The method according to claim 10, wherein the type is a corner type or an edge type.

12. The method according to claim 10, wherein if it is determined that there is only one second point of the same type near the point within the third image, a local gradient of the point is updated as an average of the local gradient of the point and a local gradient of the second point.

13. The method according to claim 10, wherein if it is determined that there is more than one second point of the same type near the point within the third image, the position of the point is updated as the position of the one of the second points whose neighborhood is most similar to a neighborhood of the point.

14. The method according to claim 13, wherein if it is determined that there is more than one second point of the same type near the point within the third image, a local gradient of the point is updated as an average of the local gradient of the point and a local gradient of the one of the second points whose neighborhood is most similar to a neighborhood of the point.

15. The method according to claim 10, wherein if it is determined that there is no second point of the same type near the point within the third image, a hold counter is determined, and the point is removed from the points to track if a maximum value of the hold counter is reached.

16. The method according to claim 1, wherein the optimal second location is the median or the average of the second locations of the encasement determined for each of the pairs.

17. The method according to claim 1, wherein the determining of the second location of the encasement comprises:
   scaling and shifting locations of the tracked points within the first image with respect to locations of corresponding points within the second image according to a transformation in which an overlap between the tracked points and the corresponding points is maximized; and
   scaling and shifting the location of the encasement according to the transformation.

18. A tracking system comprising:
   a memory; and
   a processor coupled to the memory, the processor comprising:
      encasement designation logic that designates an encasement at a first location within a first image acquired at a first time;
      point identification logic that identifies points to track within the encasement;
      point characterization logic that determines characteristics of the points to track;
      point tracking logic that tracks the points over time based on the characteristics; and
      location determination logic that determines a second location of the encasement within a second image acquired at a second time based on positions of the tracked points at the second time,
      wherein the location determination logic determines the second location by:
      selecting pairs of the tracked points;
      for each of the pairs, determining a length of the encasement based on a position of each of the points with respect to the encasement and a distance between the points;
      for each of the pairs, determining the second location of the encasement within the second image based on the length of the encasement, the position of each of the points with respect to the encasement, and a position of each of the points at the second time; and
      selecting an optimal second location of the encasement from the second locations of the encasement determined for each of the pairs.

19. A non-transitory computer-readable medium comprising computer instructions executable by a processor to cause the processor to perform a tracking method comprising:
   designating an encasement at a first location within a first image acquired at a first time;
   identifying points to track within the encasement;
   determining characteristics of the points to track;
   tracking the points over time based on the characteristics; and
   determining a second location of the encasement within a second image acquired at a second time based on positions of the tracked points at the second time,
      wherein the determining of the second location of the encasement comprises:
      selecting pairs of the tracked points;
      for each of the pairs, determining a length of the encasement based on a position of each of the points with respect to the encasement and a distance between the points;
      for each of the pairs, determining the second location of the encasement within the second image based on the length of the encasement, the position of each of the points with respect to the encasement, and a position of each of the points at the second time; and
      selecting an optimal second location of the encasement from the second locations of the encasement determined for each of the pairs.

* * * * *